United States Patent [19]

Sekmakas

[11] 3,891,527

[45] June 24, 1975

[54] WATER-DISPERSIBLE CATIONIC POLYURETHANE RESINS

[75] Inventor: Kazys Sekmakas, Chicago, Ill.

[73] Assignee: DeSoto, Inc., Des Plaines, Ill.

[22] Filed: Mar. 29, 1972

[21] Appl. No.: 239,305

Related U.S. Application Data

[63] Continuation-in-part of Ser. No. 162,659, July 14, 1971, Pat. No. 3,804,786.

[52] U.S. Cl. .............................................. 204/181
[51] Int. Cl. ............................................. B01k 5/02
[58] Field of Search ................................... 204/181

[56] References Cited
UNITED STATES PATENTS 3,679,564   7/1972   Dowbenko et al................ 204/181

*Primary Examiner*—Howard S. Williams
*Attorney, Agent, or Firm*—Dressler, Goldsmith, Clement, & Gordon, Ltd.

[57] ABSTRACT

Water-dispersible cationic resins, and especially polyurethane resins, are provided by reacting a resinous polyepoxide with a stoichiometric deficiency of polyisocyanate to provide an hydroxy-functional polyurethane in which tertiary amine functionality is generated by reaction with a monosecondary amine to provide dispersibility in water with the aid of an acid. By using resinous polyepoxides having a molecular weight of at least about 600 and particularly when esterification with a monocarboxylic acid is eliminated, films which are hard and tough and possess superior corrosion resistance can be formed.

10 Claims, No Drawings

WATER-DISPERSIBLE CATIONIC POLYURETHANE RESINS

The present application is a continuation-in-part of my prior application Ser. No. 162,659, filed July 14, 1971, now U.S. Pat. No. 3,804,786.

In my prior application, I found it to be advantageous in the production of water dispersible cationic resin to first adduct an organic solvent-soluble hydroxy functional resinous polyepoxide with a stoichiometric deficiency of organic diisocyanate, and then to adduct the hydroxy functional polyurethane so-produced with a monosecondary amine. The purpose was to extend the chain of the hydroxy functional polyepoxide through urethane formation before the hydroxy functionality became too high, as by reaction with the said amine or by reaction with monocarboxylic acid.

Accordingly, I have explored the use of polyepoxides of higher molecular weight which, because they initially possess a higher hydroxy functionality, can be used without pre-reaction with fatty acid when the reaction with monosecondary amine is delayed as previously indicated. I have now found that the fatty acid component can be entirely eliminated while obtaining adherent coatings which are hard and tough and possess superior corrosion resistance.

The reaction with monosecondary amine is intended to consume substantially all of the epoxide groups to provide a resin which is easily dispersible in water with the aid of an acid and which cures to superior corrosion resistance in the presence of aminoplast resin. The systems are particularly adapted to provide aqueous coatings which can be deposited conventionally or electrically at the cathode of a unidirectional electrical system.

The polyepoxides which are used are resinous polyepoxides having a linear aromatic backbone and a molecular weight in the range of from about 600 to about 6000, preferably about 800 to about 4000. These include a significant hydroxy value (equivalents per 100 grams) of from about 0.2 to about 0.4 enabling direct reaction with diisocyanate and providing sufficient resinification to permit good film forming properties in the absence of fatty acid plasticization. The preferred polyepoxides are preferably diglycidyl ethers of bisphenols such as bisphenol A and have a 1,2-epoxy equivalency of 1.2 or greater, more preferably 1.4 to 2.0.

While the preferred polyepoxides are illustrated above, any polyepoxide having the required molecular weight, and epoxy and hydroxy functionalities may be used, these being illustrated by copolymers of glycidyl methacrylate with an hydroxy monomer such as allyl alcohol or 2-hydroxy ethyl methacrylate with styrene or the like inert vinyl monomer.

The reaction of organic polyisocyanate, which is preferably constituted by organic diisocyanate, with the hydroxy functional polyepoxide is a low temperature addition reaction which can be carried out to completely consume the isocyanate functionality in the production of an epoxy functional polyurethane without gelation.

In this invention, the epoxy functional polyurethane is reacted to consume substantially all of the epoxy groups with a monosecondary amine in order to generate tertiary amine groups (as well as hydroxy groups) without thereby further significantly increasing molecular weight. A considerable proportion of tertiary amine groups is required to solubilize the epoxy resin derivative and it is important to be able to obtain these independent of polymer growth mechanisms. Otherwise, there is no way to control the cross-link density of the polymer while providing the number of tertiary amine groups which are needed. Also, residual epoxy groups are reactive with the desired aminoplast curing agent and, therefore, these groups should be substantially eliminated to provide desired storage stability.

The amines which are useful herein are illustrated by diethanol amine, dimethanol amine, dipropanol amine, etc. These hydroxy amines are particularly preferred since they introduce hydroxy functionality to aid water dispersibility. While other amines such as diethyl amine or dipropyl amine are useful, the hydroxy amines are superior.

The resins of this invention which are dispersible in water with the aid of an acid will contain from 2–40% by weight of the monosecondary amine component, preferably from 3–20%, and most desirably from 5–15%.

For electrocoating purposes, it is preferred that the amine component be less than 20% by weight.

Since ultimate dispersion in water is desired, the solvent used during the reactions discussed hereinbefore is preferably water miscible and inert with respect to the various reactants contemplated herein. Ketones such as methyl ethyl ketone and 2-ethoxy ethanol acetate will illustrate useful solvents which may ultimately be carried into the aqueous dispersions which are formed. Even when organic solvent is not present in the preparation of the resinous product, it is desirably used to thin the same, and the same basis for selecting the solvent applies. From 10–50% of water miscible organic solvent, based on the weight of resin solids, is desirably present.

Referring more particularly to the organic polyisocyanate component, this component is preferably constituted by organic diisocyanates. This class of materials is well known and is illustrated by the conventional toluene diisocyanates including mixed isomers thereof. While the invention will be illustrated by the use of toluene diisocyanate, the invention is not so limited and, when color is important, aliphatic diisocyanates are preferred.

With respect to the aliphatic diisocyanates, the aliphatic portion of the compound is preferably a divalent hydrocarbon radical containing at least 6 carbon atoms, preferably more than 10 carbon atoms, and up to about 22 carbon atoms. The hydrocarbon group may be straight, branched, or cyclic since all of these are useful in the practice of the invention. The diisocyanates are particularly preferred since higher functional compounds are troublesome with respect to gelation and water dispersibility, but can be used in small amount if care is taken.

Examples of aliphatic diisocyanates which may be used include dicyclohexane-4,4'-diisocyanate, tetramethylene diisocyanate, hexamethylene diisocyanate, and the like. Especially desirable is 4,4'-methylenebis (cyclohexyl isocyanate) which is a cycloaliphatic compound. Also useful are the diisocyanates based on fatty acid dimers such as that produced by dimerizing a $C_{18}$ fatty acid to obtain an aliphatic diisocyanates based on a 36 carbon divalent hydrocarbon radical. diisocyanates chain diisoycanates are illustrated by 2-ethyl hexane 1,6-diisocyanate.

The proportion of organic diisocyanate is important. While the invention broadly contemplates the use of up to 25% by weight, based on the weight of the final resinous product, it is preferred that a smaller proportion be used, the preferred proportions on the same basis ranging from 0.25–15% by weight, Most preferably, from 0.5–10% of diisocyanate is used. Of course, a stoichiometric deficiency of diisocyanate is essential and it is preferred to use a ratio of hydroxy to isocyanate of from 3:2 to 50:1, preferably from 2:1 to 30:1.

It is stressed that while small proportions of diisocyanate are contemplated and preferred, these exhibit a considerable effect on the resin which is produced in that toughness and flexibility are significantly enhanced.

Also, and as previously stressed, all of the reactions which are utilized herein are addition reactions, and these are conveniently referred to as adducts. Indeed, a small proportion of the hydroxy functionality in the resin may be reacted with a polycarboxylic acid monoanhydride illustrated by trimellitic anhydride or maleic anhydride in order to provide a small acid functionality (an acid value of about 5 to about 25) in order to serve as an internal acid catalyst to enhance the aminoplast cure. However, in the systems under consideration, the aminoplast cure is excellent and does not normally require internal catalysis.

From the standpoint of water solutions, it will be appreciated that the resins are dispersed in water with the aid of an acid, the specific nature of the acid being of secondary significance. Inorganic acids such as hydrochloric acid or sulfuric acid are quite useful, though it is presently preferred to employ organic acids such as formic acid, acetic acid, propionic acid, or butyric acid.

The water dispersions which are provided are desirably employed for electrocoating in which a unidirectional electrical current is passed through an aqueous bath containing the dispersed resin and then through an object to be coated as cathode in order to electrophoretically deposit the resin solids on the surface of the cathode. Cathodic deposition possesses numerous advantages over the far more widely used anodic deposition methods and it will be appreciated that the cathodic electro-deposition under consideration is known. Thus, one would normally employ a bath having a resin solids content of from 3–25%, preferably from 5–15%, and having a pH in the range of 2 to 7, preferably 3 to 6. Far higher solids content (at least about 30%) is needed for conventional application as by spray, roller coat, brush, etc.

In electrodeposition as well as in conventional application, aminoplast resins are normally used to aid the cure in an amount of 5–50% of total resin. In electrodeposition, the solids content of the bath is low and the electrocoated films possess unusually superior gloss, hardness, flexibility and salt spray resistance providing excellent single coat electrodeposition systems. Also, and while various aminoplast resins are frequently used to aid the cure, these aminoplast resins will migrate to the cathode together with the resins of this invention in the aqueous acidic medium. In this respect, the cathodic deposition is somewhat simpler than the corresponding anodic deposition since any water soluble or water-dispersible aminoplast resin may be used.

It will further be appreciated that pigment may be dispersed with the resins of this invention for codeposition therewith and various other conventional additions are also appropriate as is well known.

The invention is illustrated in the following examples.

EXAMPLE 1

Epoxy-Urethane-Water Soluble Resin

Charge 750 parts diglycidyl ether of bisphenol A having an average molecular weight of 1000 and an hydroxyl value of 0.32 (1.5 epoxy equivalents) and 250 parts methyl ethyl ketone to reactor and heat to 70°C. to melt. Add 30 parts toluene diisocyanate (0.35 equivalents) over a 20 minute period and hold for 30 minutes. Raise temperature to 90°C. and hold for 30 minutes. Cool to 35°C. and add 155 parts (1½ equivalents) diethanol amine over a 30 minute period. Hold for 1 hour. Heat to 70°C. and hold for two hours. Slowly add 95 parts glacial acetic acid, 700 parts deionized water, and 200 parts 2-butoxy ethanol (addition is completed in 30 minutes). Cool to 30°C. to provide a product having the following final characteristics:

| Solids | 44.2% |
|---|---|
| Gardner viscosity: | U |
| Gardner-Holdt Color | 3 |

Evaluation of Water Soluble Urethane Resin of Example 1 in Electrodeposition Coatings Premix, using high speed agitation, 20 parts of the polyurethane resin of Example 1, 22 parts water dispersible benzoguanamine formaldehyde condensate, and 10 parts 2-butoxy ethanol. Then add, with fast mixing, 180 additional parts of the polyurethane resin of Example 1. The resin so-provided is then dispersed in 850 parts of deionized water (using fast mixing) to provide a clear aqueous solution having a pH of 5.3.

Zinc phosphate treated steel panels were coated from the above clear solution through electrical deposition on the cathode using a bath temperature of 28°C., a deposition time of 60 seconds, a potential of 70 volts, and a current of 6.0 amps which falls off to 0.2 amp at the end of the 60 second period.

The resulting coating on the cathode was cured in an electric oven for twenty minutes at 215°C. A glossy, hard, and flexible coating was obtained, which had the following characteristics:

| Pencil hardness | 4H–5H |
|---|---|
| Impact (Direct 80 in./lb.) | Pass |
| Impact (Reverse 80 in./lb.) | Pass |
| Flexibility (¼ in. Mandrel) | Pass |
| Loss of adhesion after bending | None |
| Gloss (60° photovolt) | 89 |
| Resistance to 100 methyl ethyl ketone rubs | Excellent |
| 5% salt fog resistance — Pass 500 hrs. with no rusting. | |

This combination of hardness, impact resistance, gloss and solvent and corrosion resistance, is highly unusual and is especially outstanding when it is considered that it is here obtained from an aqueous coating deposited electrically.

In the above example, in which all parts are by weight, Epon 1001 (Shell) can be used as the diglycidyl ether of bisphenol A and XM 1123 (American Cyanamid) may be used as the water-dispersible resin with corresponding results. Epon 1004, a higher molecular weight version of Epon 1001 is also highly useful.

The invention is defined in the claims which follow.

I claim:

1. A method of electrodepositing a hard impact resistant and corrosion resistant film on the cathode of a unidirectional electrical system comprising passing a unidirectional electrical current through an aqueous coating composition comprising water having dispersed therein an hydroxy functional cationic resin comprising an adduct of a resinous polyepoxide having a molecular weight in the range of about 600 to about 6000 and an hydroxy value of from about 0.2 to about 0.4, a stoichiometric deficiency of organic polyisocyanate and a monosecondary amine in an amount to consume substantially all of the epoxy functionality of said polyepoxide, said cationic resin being dispersed in the water by means of an acid, and then through said cathode to deposit a resin film thereon, and baking said film to cure the same.

2. A method of electrodepositing as recited in claim 1 in which said resinous polyepoxide has a linear aromatic backbone and a 1,2-epoxy equivalency of at least 1.2.

3. A method of electrodepositing as recited in claim 1 in which said resinous polyepoxide is a diglycidyl ether of a bisphenol having a molecular weight in the range of from about 800 to about 4000 and a 1,2-epoxy equivalency of from 1.4 to 2.0.

4. A method of electrodepositing as recited in claim 1 in which said monosecondary amine is an hydroxy amine.

5. A method of electrodepositing as recited in claim 4 in which said hydroxy amine is selected from the group consisting of dimethanol amine, diethanol amine, and dipropanol amine.

6. A method of electrodepositing as recited in claim 1 in which said organic polyisocyanate is used in an amount to provide a ratio of hydroxy groups in said polyepoxide to isocyanate groups of from 3:2 to 50:1.

7. A method of electrodepositing as recited in claim 6 in which the ratio of hydroxy groups to isocyanate groups is from 2:1 to 30:1.

8. A method of electrodepositing as recited in claim 1 in which said dispersion includes from 10–50% of water miscible organic solvent, based on resin solids.

9. A method of electrodepositing as recited in claim 1 in which said organic polyisocyanate is a diisocyanate and said diisocyanate is adducted with said polyepoxide before the epoxy groups are consumed to increase the hydroxy functionality of said polyepoxide.

10. A method as recited in claim 1 in which an aminoplast resin is also dispersed in the water of said aqueous coating composition to aid the cure.

* * * * *